(12) United States Patent
Le et al.

(10) Patent No.: US 10,431,205 B2
(45) Date of Patent: Oct. 1, 2019

(54) DIALOG DEVICE WITH DIALOG SUPPORT GENERATED USING A MIXTURE OF LANGUAGE MODELS COMBINED USING A RECURRENT NEURAL NETWORK

(71) Applicant: Conduent Business Services, LLC, Dallas, TX (US)

(72) Inventors: Phong Le, Amsterdam (NL); Marc Dymetman, Grenoble (FR); Jean-Michel Renders, Quaix-en-Chartreuse (FR)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 29 days.

(21) Appl. No.: 15/139,886

(22) Filed: Apr. 27, 2016

(65) Prior Publication Data

US 2017/0316775 A1    Nov. 2, 2017

(51) Int. Cl.
| | | |
|---|---|---|
| *G10L 15/16* | (2006.01) | |
| *G10L 15/22* | (2006.01) | |
| *G10L 15/18* | (2013.01) | |
| *G06F 16/332* | (2019.01) | |
| *G06F 17/27* | (2006.01) | |

(52) U.S. Cl.
CPC .......... *G10L 15/16* (2013.01); *G06F 16/3329* (2019.01); *G06F 17/279* (2013.01); *G10L 15/18* (2013.01); *G10L 15/22* (2013.01)

(58) Field of Classification Search
CPC ....................................................... G10L 15/16
USPC ......................................................... 704/232
See application file for complete search history.

(56) References Cited

U.S. PATENT DOCUMENTS

| 2015/0255060 A1* | 9/2015 | Tomita .................... G10L 15/02 704/254 |
| 2016/0352656 A1* | 12/2016 | Galley .................... H04L 51/02 |
| 2017/0053646 A1* | 2/2017 | Watanabe ........... G10L 15/1822 |

OTHER PUBLICATIONS

A. Graves, A.-r. Mohamed, and G. Hinton, "Speech recognition with deep recurrent neural networks," in 2013 IEEE international conference on acoustics, speech and signal processing. IEEE, 2013, pp. 6645-6649. (Year: 2013).*
Duchi, et al., "Adaptive Subgradient Methods for Online Learning and Stochastic Optimization," Journal of Machine Learning Research, vol. 12, pp. 2121-2159 (2011).
(Continued)

*Primary Examiner* — Richemond Dorvil
*Assistant Examiner* — Rodrigo A Chavez
(74) *Attorney, Agent, or Firm* — Fay Sharpe LLP

(57) ABSTRACT

A dialog device comprises a natural language interfacing device (chat interface or a telephonic device), and a natural language output device (the chat interface, a display device, or a speech synthesizer outputting to the telephonic device). A computer stores natural language dialog conducted via the interfacing device and constructs a current utterance word-by-word. Each word is chosen by applying a plurality of language models to a context comprising concatenation of the stored dialog and the current utterance thus far. Each language model outputs a distribution over the words of a vocabulary. A recurrent neural network (RNN) is applied to the distributions to generate a mixture distribution. The next word is chosen using the mixture distribution. The output device outputs the current natural language utterance after it has been constructed by the computer.

18 Claims, 10 Drawing Sheets

(56) References Cited

OTHER PUBLICATIONS

Fader, et al., "Paraphrase-Driven Learning for Open Question Answering," Proceedings of the 51$^{st}$ Annual Meeting of the Association for Computational Linguistics, pp. 1608-1618 (2013).
Florian, et al., "Dynamic Nonlocal Language Modeling via Hierarchical Topic-Based Adaptation," Computer Science Dept. and Center for Language and Speech Processing, Johns Hopkins University, pp. 1-8 (2001).
Graves, "Supervised Sequence Labelling with Recurrent Neural Networks," Springer Berlin Heidelberg, pp. i-129 (2012).
Hochreiter, et al., "Long Short-Term Memory," Neural Computation, vol. 9(8), pp. 1735-1780 (1997).
Jacobs, et al., "A competitive modular connectionist architecture," Advances in neural information processing systems, MIT, pp. 767-773 (1991).
Radford, et al., "Named entity recognition with document-specific KB tag gazetteers," Proceedings of the 2015 Conference on Empirical Methods in Natural Language Processing, pp. 512-517 (2015).
Serban, et al., "Hierarchical Neural Network Generative Models for Movie Dialogues," arXiv preprint arXiv:1507.04808, pp. 1-11 (2015).
Shang, et al., "Neural Responding Machine for Short-Text Conversation," Proceedings of the 53$^{rd}$ Annual Meeting of the Association for Computational Linguistics, pp. 1577-1586 (2015).
Sordoni, et al., "A Neural Network Approach to Context-Sensitive Generation of Conversational Responses," Human Language Technologies, ACL, pp. 196-205 (2015).
Sutskever, et al., "Sequence to Sequence Learning with Neural Networks," Advances in neural information processing systems, pp. 3104-3112 (2014).
Weston, et al., "Memory Networks," arXiv preprint arXiv:1410.3916, pp. 1-15 (2014).
Vinyals, et al., "A Neural Conversational Model," arXiv preprint arXiv:1506.05869, pp. 1-8 (2015).

\* cited by examiner

```
7760 | 121686798 | log started fri may 06 10:50:43 pdt 2011
                                                                    ,--HEAD
-lsb- 10:51:33 -rsb- you have been connected to X .
```
— HEAD

```
-lsb- 10:51:49 -rsb-  X : hello and thanks for contacting Z ! my name
                          is X , how can i assist you today ?
-lsb- 10:52:13 -rsb-  Y : how do i change the text notification on my
                          htc evo
-lsb- 10:53:06 -rsb-  X : sorry you are having problems with that but
                          you are in the right place . before we begin
                          can i start with you name please ?
-lsb- 10:53:28 -rsb-  Y : Y test
-lsb- 10:53:55 -rsb-  X : thank you Y . one moment while i pull up the
                          information on that device .
-lsb- 10:54:36 -rsb-  Y : i am using this to showcase the shack support
                          to an employee if you guys are busy we can
      TIME              try this later
```

```
-lsb- -- end of transcript as seen by customer -- -rsb-

-lsb- 10:55:10 -rsb- the customer has ended the chat session .
-lsb- 10:55:10 -rsb- store 013276 has left the session .
-lsb- 10:58:22 -rsb- edward has left the session .

log ended fri may 06 10:58:22 pdt 2011
| | 2011-05-06 10:58:22                        ,--TAIL
```

FIG. 4

DIALOG DEVICE WITH DIALOG SUPPORT GENERATED USING A MIXTURE OF LANGUAGE MODELS COMBINED USING A RECURRENT NEURAL NETWORK

BACKGROUND

The following relates to the dialog system arts, customer support arts, call center arts, and related arts.

A dialog system is based on, or augments, a natural language interfacing device such as a chat interface or a telephonic device. A chat interface is typically Internet-based and enables a chat participant to enter and receive textual dialog utterances. Each participant operates his or her own chat interface, and typed or dictated utterances from each participant are displayed on both (or all) participants' chat interfaces, so that the participants can conduct a dialog. The chat interfaces may support other content exchange, e.g. one participant may present a (possibly multi-media) document that is displayed on both (or all) participants' chat interfaces. Other examples of natural language interfacing devices include telephonic devices such as conventional telephones or cellular telephones, or tablet computers, notebook computers, or the like having appropriate audio components (microphone and earphone or loudspeaker, or full audio headset). The telephonic device may provide audio-only interfacing, or the natural language dialog may be augmented by video (e.g., the telephonic device may be a video conferencing device).

Such dialog systems are ubiquitous and widely used for diverse applications. One common application is to provide customer support for customers, clients, users, or the like. In, a typical arrangement, the support provides a call center to which a customer, client, or the like calls. The call center is staffed by call center agents who handle customer calls. Ideally, the call center agents have expertise in the product, service, or the like for which support is to be provided. In practice, however, call center agents have limited knowledge and expertise, which can limit their effectiveness.

One way to improve call center quality is through the use of a semi-automated or fully automated dialog system. In a semi-automated dialog system, the ongoing dialog is recorded and processed to predict an appropriate current utterance for the call center agent to express. The current utterance, or a list of current utterance candidates, is typically displayed on a display component of the natural language interfacing device. For example, if the interfacing device is a chat interface comprising computer with a connected headset running chat software, then the list of current utterance candidates may be displayed in a suggestions window shown on the computer display. The call center agent can refer to this list and may choose one of the utterance candidates for responding to the caller (either verbatim or with edits made by the call center agent). Such an approach is semi-automated since the dialog system generates suggested utterances but the call center agent conducts the actual dialog. In an alternative, fully automated approach, the dialog system chooses a single "best" utterance and actually expresses that utterance to the caller, e.g. by automatically generating a typed response via a chat interface, or by operating a speech synthesizer to automatically "speak" the utterance to the caller at the opposite end of a telephonic call.

Dialog systems can advantageously support a call center agent by providing response suggestions (semi-automated systems) or can replace the call center agent entirely by acting as a "virtual agent" (fully automated systems). However, for customer or client support systems or other dialog systems for knowledge domain-specific applications, a complication arises. The utterances generated by the dialog system are generally expected to exhibit expertise in a relatively narrow knowledge domain. For example, a dialog system of a call center maintained by an electronics retailer may be expected to provide expert advice regarding various consumer electronic devices, such as various makes/models of cellular telephones, computers, or so forth. Thus, the utterances generated by the dialog system should be correct as to information within this knowledge domain and pertinent to the current dialog point. At the same time, the utterances generated by the dialog system should be effective natural language communication, for example employing proper vocabulary and grammar, and correctly using common phrases, and so forth.

A common dialog system architecture includes a natural language understanding (NLU) component, a natural language generation (NLG) component, and a "central orchestrator" usually referred to as a dialog manager (DM), which takes input from the NLU component, updates an internal state, consults a Knowledge Base to decide on a next dialog action (DA) to take, and communicates this DA to the NLG component which generates a natural language utterance implementing the DA. Generating a cohesive integration of these various components for supporting or engaging in domain-specific dialog is difficult. The NLU component can encapsulate domain-specific expertise, but the NLG component is not domain-specific and as such may improperly handle a domain-specific DA that is output by the NLU component. It is challenging to effectively train the NLU/DM/NLG chain to consistently communicate domain-specific information via natural language utterances that conform to proper vocabulary, grammar, and other natural language expression rules.

BRIEF DESCRIPTION

In some embodiments disclosed herein, a dialog device comprises: a natural language interfacing device comprising a chat interface or a telephonic device; a natural language output device comprising the chat interface, a display device, or a speech synthesizer outputting speech to the telephonic device; and a computer. The computer is programmed to store natural language dialog conducted via the natural language interfacing device and to construct a current natural language utterance word-by-word, with each word of the current natural language utterance being chosen by operations including: applying a plurality of language models to a context comprising a concatenation of the stored natural language dialog and the current natural language utterance up to but not including the word being chosen to output, for each applied language model, a distribution over the words of a vocabulary; normalizing the distributions output by the plurality of language models to generate corresponding normalized distributions; applying a recurrent neural network (RNN) to the normalized distributions to generate a mixture distribution; and choosing the next word using the mixture distribution. The natural language output device is configured to output the current natural language utterance after it has been constructed by the computer.

In some embodiments disclosed herein, a dialog method is disclosed, comprising: conducting a natural language dialog using a chat interface or a telephonic device; while conducting the natural language dialog, constructing a current natural language utterance word-by-word; and outputting the constructed current natural language utterance via one of the chat interface, a display device, and a speech synthesizer outputting speech to the telephonic device. The current natural language utterance is constructed word-by-word using a computer programmed to choose each word of the current natural language utterance by operations including: applying a plurality of language models to a context comprising a concatenation of the natural language dialog and the current natural language utterance up to but not including the word being chosen; applying a recurrent neural network (RNN) to word distributions output by the applied plurality of language models to generate a mixture distribution; and choosing the next word using the mixture distribution.

In some embodiments disclosed herein, a non-transitory storage medium stores instructions readable and executable by a computer to construct a current natural language utterance for continuing a natural language dialog by a method in which each word of the current natural language utterance is chosen by operations including: applying a plurality of language models to a context comprising a concatenation of the natural language dialog and the current natural language utterance up to but not including the word being chosen; normalizing word distributions output by the plurality of language models to generate corresponding normalized word distributions; applying a recurrent neural network (RNN) to the normalized distributions to generate a mixture distribution; and choosing the next word using the mixture distribution.

BRIEF DESCRIPTION OF THE DRAWINGS

FIG. 4 diagrammatically illustrates preprocessing of a dialog.

DETAILED DESCRIPTION

In dialog systems disclosed herein, the NLU/DM/NLG utterance generation chain is replaced by a set of language models (LMs) whose outputs are combined using a single Recurrent Neural Network (RNN) that generates a current natural language utterance from the dialogue history up to the point where this current utterance is to be produced. The RNN in this context can be seen as a form of conditional neural language model, where the dialogue history provides the context for the production of the current utterance. In illustrative embodiments, the RNN is a Long Short-Term Memory (LSTM) model, which can effectively exploit long distance memories for computing the current utterance. Other types of RNN are contemplated for combining LM outputs as disclosed herein, such as a Gated Recurrent Unit (GRU). In some illustrative embodiments the RNN integrates only two LMs—a question-answer (QA) LM configured to provide a distribution of answers obtained from a knowledge base (KB) over questions directed to the KB; and a second language model that is not configured to provide answers obtained from a KB. This mixing of two language models provides an integration of knowledge domain-specific responses (via the QA-LM) and responses that emphasize employing appropriate vocabulary, grammar, proper phrasing possibly including idiomatic phrasing, and so forth (via the second language model). While some illustrative examples employ two LMs, more generally the disclosed approaches can employ the RNN to integrate or mix an arbitrary number of LMs.

Figure 1:
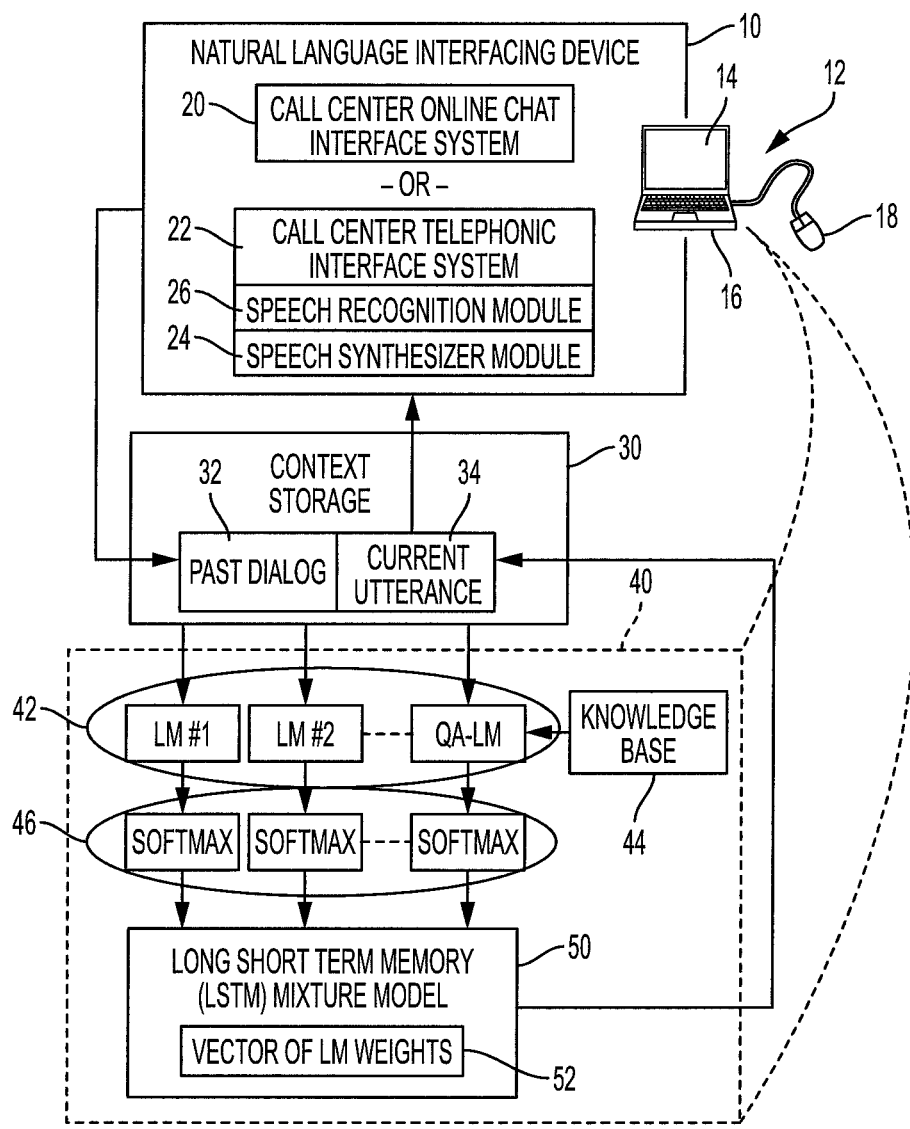
FIG. 1 diagrammatically illustrates a dialog device.

With reference to FIG. 1, a dialog device is illustrated, which maintains one end of a two-way or multi-way dialog via a chat system or a telephonic link. In examples herein, the dialog is assumed to be between (1) a call center agent at a customer or client support call center and (2) a customer or client seeking support in using a product, service, or the like. Further, in the examples herein the dialog device of FIG. 1 is assumed to be utilized by or embody the call center agent in this dialog. This designation is merely for illustrative convenience, and the disclosed dialog devices may be used in other contexts. The dialog device includes a natural language interfacing device 10, such as a chat interface system or a telephonic device. The illustrative natural language interfacing device 10 is implemented as a computer 12 including a display component or device 14 and one or more user input components or devices such as an illustrative keyboard 16, an illustrative mouse 18 or other pointing device (e.g. trackball, trackpad), a touch-sensitive overlay of the display 14 employing, for example, a capacitive or surface acoustic wave (SAW) touch-sensing technology, a dictation microphone (not shown), and/or so forth.

In some embodiments the computer 12 carries out the dialog using a call center online chat system 20 implemented by execution of a chat program on the computer 12, via which the call center agent views textual messages on the display component 14 from a customer or client seeking support and sends text messages to the customer or client input via the keyboard 16 or dictated via a dictation microphone. In a fully automated mode there is no human call center agent, and instead the computer 12 generates dialog automatically using techniques disclosed herein and transmits the dialog to the client or customer as text messages sent via the chat system 20.

In the case of the natural language interfacing device 10 comprising a telephonic device, the computer 10 includes appropriate audio components (microphone and earphone or loudspeaker, or full audio headset, not shown) and runs a suitable teleconferencing software 22 for conducting a telephone call (optionally also including two-way video, i.e. a videoconference call). If the telephonic dialog device is fully automated then the audio components also include a speech synthesizer module 24, e.g. including software running on the computer 12 and a physical speaker or electronic signal generator, for synthesizing spoken responses of the automated agent. In the case of a semi-automated embodiment, the computer-based telephonic hardware is optionally replaced by a physically separate unit, e.g. a telephone handset. Further, a speech recognition module 26 is suitably implemented by a microphone that picks up the spoken dialog and software executing on the computer 12 to electronically transcribe the speech to text content.

In either a chat embodiment or a telephonic embodiment (with optional video component), the natural language interfacing device 10 enables the agent to engage in a dialog with the customer or client (by text messaging in chat embodiments, or by speech in telephonic embodiments). In fully automated embodiments, the natural language interfacing device 10 also automatically outputs the agent-side of the dialog by generating text message responses or synthesized speech responses. As the dialog progresses via chat or telephonic communication, it is recorded and stored in a context storage 30 as past dialog 32. In the case of a chat embodiment, the past dialog 32 is directly obtained as a concatenation of successive text messages stored electronically, e.g. as ASCII text strings. In the case of a telephonic embodiment the spoken dialog is picked up by a microphone and converted to text by the speech recognition module 26 in order to be stored as the past dialog 32. The context storage 30 may, for example, be an internal hard disk drive or solid state drive (SSD) of the computer 12, or an external hard drive or SSD connected with the computer 12 by a cable (e.g. USB cable) or via an electronic network, e.g. an Ethernet.

To provide agent-side dialog suggestions (in semi-automated embodiments) or agent-side dialog (in fully automated embodiments), the computer 12 is further programmed to construct a current natural language utterance 34 word-by-word, with each word of the current natural language utterance 34 being chosen by a dialog support module 40 implemented by suitable programming of the computer 12 to implement one or more embodiments of the dialog generation approaches disclosed herein. A plurality of language models (LMs) 42 are applied to the context comprising a concatenation of the stored natural language dialog 32 and the current natural language utterance 34 up to (but not including) the word being chosen. The LMs 42 output, for each applied language model, a distribution over the words of a vocabulary. To provide dialog effective for expressing domain-specific content, at least one of the LMs 42 may optionally be a question-answer LM (QA-LM) that generates a distribution of words over the vocabulary based at least in part on content of a knowledge base (KB) 44 containing domain-specific information. For example, if the call center provides support for cellular telephone users then the KB 44 may store data on supported cellular telephone models, such as memory capacity, configuration customization instructions, or so forth. The distributions output by the plurality of LMs 42 are normalized by normalization functions 46, e.g. softmax functions 46 in the illustrative example of FIG. 1, or sigmoid functions in embodiments with only two LMs, in order to generate corresponding normalized distributions over the words of the vocabulary. A recurrent neural network (RNN) 50 is applied to the normalized distributions to generate a mixture distribution over the words of the vocabulary. In the illustrative embodiment the RNN is a long short-term memory (LSTM) mixture model 50, although other RNN architectures such as a Gated Recurrent Unit (GRU) architecture may be employed as the RNN. In general, the RNN 50 includes a vector of LM weights 52 that are used by the RNN 50 to appropriately weight each normalized distribution output by a respective LM 42 in the mixture distribution.

The next word of the agent-side utterance (or suggested utterance) is chosen using the mixture distribution output by the RNN 50. For example, in an automated embodiment the next word of the utterance is chosen as the most probable word according to the mixture distribution. In a semi-automated embodiment, the next word may be chosen by sampling the mixture distribution, and the process may be repeated several times to construct a plurality of current utterance candidates. The chosen word is added to (i.e. concatenated to) the current utterance 34, so that the current utterance 34 is constructed word-by-word. When complete, the current utterance 34 is fed back to the natural language interfacing device 10 and may be used in various ways depending upon the dialog modality (chat or telephonic) and level of automation (semi-automated or fully automated) as discussed next.

The current utterance 34 is suitably stored as text, e.g. ASCII text, which in a chat embodiment may directly form a latest agent-side message (or message suggestion). In telephonic embodiments, the current utterance 34 may be presented as a suggestion on the display component 14, or may be converted to speech using the speech synthesizer module 24. In semi-automated embodiments (both chat and telephonic) the current utterance 34 is a suggestion that is suitably displayed in a suggestions window of the display device 14 for reference by a human agent engaged in the dialog. As previously noted the dialog support module 40 may be invoked several times in semi-automatic mode, using sampling of the mixture distribution for each word, so that different suggested utterances are generated by the several invocations, and these several utterance suggestions may be displayed in the suggestions window of the display device 14. In automated embodiments the current utterance is transmitted to the customer or client, e.g. as a text message in chat embodiments or by operation of the speech synthesizer 24 and transmission via the telephonic link to the customer or client as synthesized speech.

Having provided an overview of some suitable dialog system embodiments with reference to FIG. 1, some more detailed embodiments of the dialog support module 40 are next described.

The RNN 50 adaptively mixes the set of LMs 42. Let x be an input, $F_1, F_2, \ldots, F_K$ be K LMs 42. The output of this mixture is given by:

$$y = \sum_{k=1}^{K} p(k \mid x) F_k(x) \quad (1)$$

where the p(k|x) terms are computed by a gating network, which is a neural network whose output is a normalized vector (e.g., normalized using the softmax layer 46). Conceptually, if the various LMs 42 are expert in various sub-fields (e.g. expert in technical content in the case of the QA-LM, expert in natural language phrasing in the case of some other LM) then they can be combined to produce the RNN 50 which is then expert in the span of sub-fields. The gating network selects which LM should be chosen to deal with the input.

The illustrative embodiment employs a LSTM as the RNN 50. The LSTM architecture maintains a memory in a hidden layer of all inputs received over time, by adding up all (gated) inputs to the hidden layer through time to a memory cell. In this way, errors propagated back through time do not vanish and even inputs received a long time ago are still (approximately) preserved and can play a role in computing the output of the network.

Figure 2:
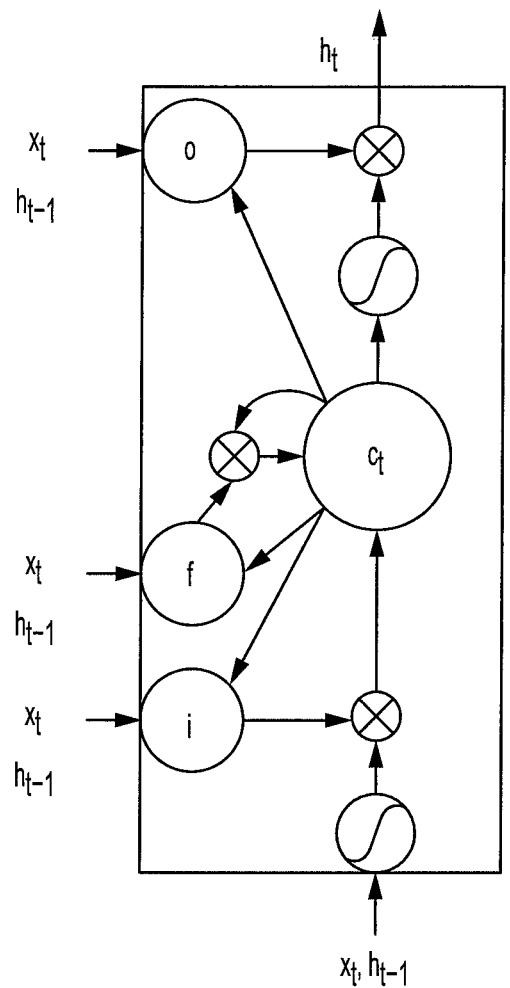
FIG. 2 diagrammatically shows an LSTM cell.

With reference to FIG. 2, an LSTM cell is shown. The LSTM cell includes a memory cell c, an input gate i, a forget gate f, and an output gate o. Let $h_{t-1}$ be the output at time step t−1 and $x_t$ be the input at time t, computations occurring in the LSTM cell of FIG. 2 are given below:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t \odot c_{t-1} + i_t \odot \tan h(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \odot \tan h(c_t)$$

where σ is the sigmoid function; $i_t$, $f_t$, $o_t$ are the outputs (i.e. activations) of the corresponding gates; $c_t$ is the state of the memory cell; the symbol "⊙" denotes the element-wise multiplication operation; and the W and b terms are weight matrices and bias vectors.

Because the sigmoid function has the output range (0,1), activations of those gates can be seen as normalized weights. Therefore, intuitively, the network can learn to use the input gate to decide when to memorize information, and similarly learn to use the output gate to decide when to access that memory. The forget gate, finally, is to reset the memory.

Figure 3:
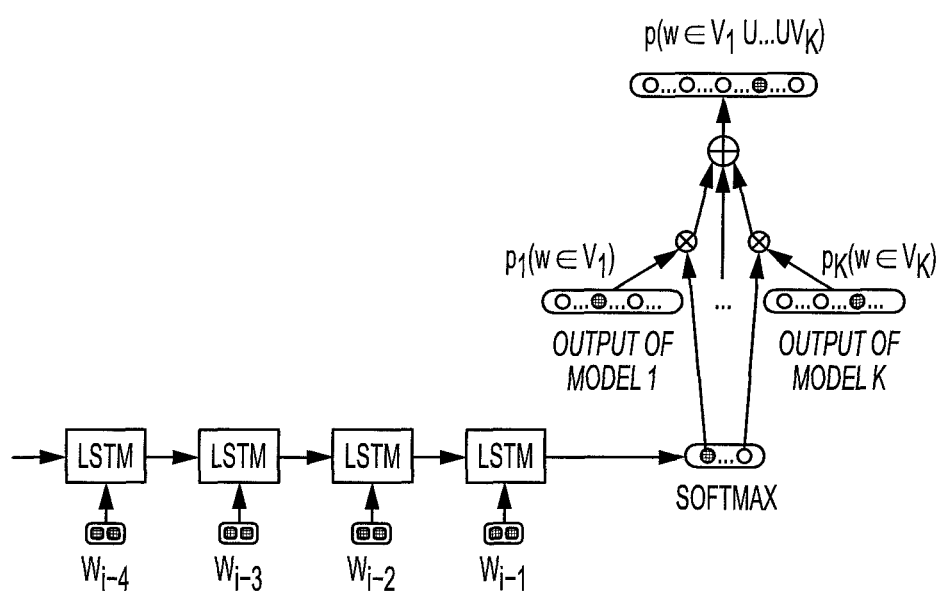
FIG. 3 diagrammatically shows an embodiment of the mixture model implemented by the dialog support module of the dialog device of FIG. 1.

With reference to FIG. 3, an illustrative embodiment of the mixture model implemented by the dialog support module 40 using LSTM architecture as the RNN 50 is diagrammatically shown. Let $w_1^t = w_1 \ldots w_t$ be the past dialog 32 concatenated with the current utterance 34 (up to but not including the word being chosen), i.e. the dialog history. There are K LM's (where K is a positive integer having a value of at least two) that compute distributions over their respective vocabularies $V_k$, k=1, ..., K. The distributions can be written as $p_k(w \in V_k | w_1^t)$ ∀k=1, ..., K. The LSTM is used to encode the history word-by-word into a vector which is the hidden state $h_t$ of the LSTM at time step t. The softmax layer 46 is used to compute probabilities associated with the K LMs 42 according to:

$$p(k | w_1^t) = \frac{e^{u(k,h_t)}}{\sum_{k'=1}^{K} e^{u(k',h_t)}} \quad (2)$$

where $[u(1,h_t), \ldots, u(K,h_t)]^T = Wh_t + b$. In the foregoing, the term $W \in \mathbb{R}^{K \times dim(h_t)}$ is a weight matrix, and the term $b \in \mathbb{R}^K$ is a bias vector. The final output is given by:

$$p(w | w_1^t) = \sum_{k=1}^{K} p(k | w_1^t) p_k(w | w_1^t) \quad (3)$$

To demonstrate the disclosed dialog support module 40 for some specific LMs, tests were performed using a dialog corpus consisting of 165,146 dialogs from a technology company in the domain of mobile telephony support. The corpus was split into training, development, and test data sets whose sizes were 145,146 dialogs, 10,000 dialogs, and 10,000 dialogs, respectively.

With reference to FIG. 4, each dialog was preprocessed to tokenize (using Stanford CoreNLP in the actually performed tests) and convert the dialog to lowercase. Unused information such as head, tail, and chat time were removed. FIG. 4 shows an example of a dialog after tokenization and lowercasing. The indicated head, tail, and time sections are removed. (Note that actual names are anonymized in FIG. 4, as well as in all other dialog examples presented herein).

For each response found in a dialog, a context-response pair was created whose context consists of all sentences appearing before the response. For each context, to mark where its ends, a token "<EOC>" was added to its tail. The prefix tokens "<CLIENT>" and "<AGENT>" were also added to inform whether the following utterance was from the client or from the agent. For each response, a token "<EOR>" was added to its tail. Below is an example:

Context <CLIENT> how do i change the text notification on my htc evo <AGENT> sorry you are having problems with that but you are in the right place. before we begin can i start with you name please ?<CLIENT> Y test <EOC>

Response thank you Y. one moment while i pull up the information on that device. <EOR>

Usually the dialog alternates between <CLIENT> and <AGENT> turns, where in each <AGENT> turn the agent is providing a response to the client utterance of the immediately preceding <CLIENT> turn. However, in some cases the agent may need to provide two or more responses to the last client utterance (or, stated another way, the agent-side turn may include more than one response). In such cases, a token <pause> is added to the tail of the agent responses, e.g. in the form "<pause><EOC>. Similarly, for long responses, provision is made for breaking the response into multiple lines by adding to the tail of the current response a token "<newline>". Because long responses make both training and generation difficult, a long response is split into smaller ones and "<newline>" tokens are used to mark the breakpoints. For the actually processed dialog training data, the context-response extraction process yielded 973,684 pairs for training, 74,141 pairs for development, and 75,474 pairs for testing.

For the tests, the knowledge base 44 used consisted of 1,744,565 device-attribute-value triples, e.g.

[Apple iPhone 5] [camera megapixels] [8.0]

There were 4729 devices and 608 attributes in the knowledge base. Because only numeric values were considered, only triples that satisfy this were chosen, resulting in a set of 65,226 triples of 34 attributes. The 34 attributes are listed in Table 1. Since this knowledge base used standard units (e.g., "megabyte" for storage, "mhz" for CPU frequency) but call center agents sometimes use other units (e.g., "gigabyte", "ghz"), each value in the knowledge base was converted to other units if applicable.

TABLE 1

| list of attributes |
| --- |
| List of attributes |
| battery capacity |
| battery standby time |
| battery talk time |
| browser screen size |
| camera digital zoom factor |
| camera maximum resolution |
| camera megapixels |
| camera optical zoom factor |
| cpu |
| cpu maximum frequency |
| internal ram |
| internal storage |
| java app usable screen size |
| java max memory size |
| native app usable screen size |
| primary screen physical height |
| primary screen physical width |

TABLE 1-continued list of attributes
List of attributes primary screen rotate
primary screen type
removable memory maximum size
rendering screen size
screen orientation
screen size
screen size char
secondary camera maximum resolution
secondary camera megapixels
secondary screen physical height
secondary screen physical width
secondary screen size
secondary screen size char
secondary screen type
sync contacts to removable memory
wallpaper external screen usable size
wallpaper internal screen usable size The target context-response pairs were those in which the client asks about numeric value attributes. Because the dialogues were not classified as to this format, a simple heuristic was employed to select target context-response pairs: a context-response pair is chosen if its response contained a number and one of the following keywords: cpu, processor, ghz, mhz, memory, mb(s), gb(s), byte, pixel, height, width, weigh, size, camera, mp, hour(s), or mah. Using this heuristic, 17,660 pairs were collected for training, 1,362 pairs were collected for development, and 1,394 pairs were collected for testing. These sets are significantly smaller than the collected dialog pairs. Examining the total 27,600 tokens in the development set, only 1,875 (6.8%) value tokens were found in the knowledge base.

The actually performed tests employed two language models: a neural chat model for capturing natural language content, and a QA-LM for capturing domain-specific content. It is to be understood that these are merely illustrative examples and the disclosed approach can in general use any number and type(s) of language models. In the following, the illustrative neural chat LM is first described, followed by the illustrative QA-LM.

Figure 5:
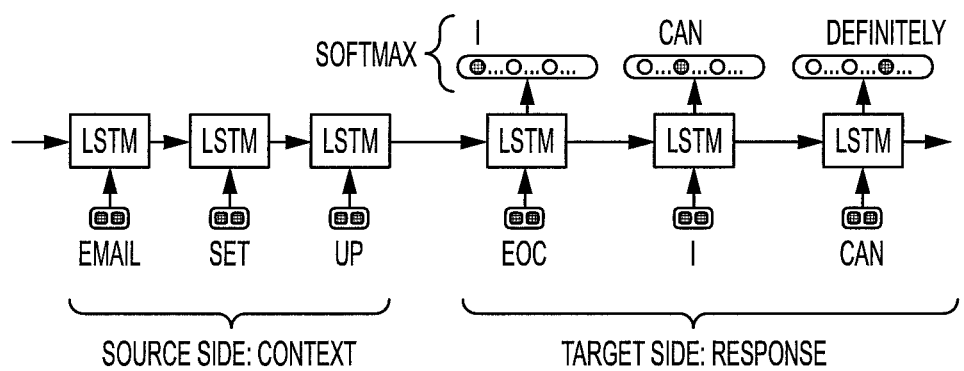
FIG. 5 diagrammatically shows an illustrative neural chat language model (LM).

With reference to FIG. 5, the neural chat LM is diagrammatically shown. The model shown in FIG. 5 is a shallow version of a sequence-to-sequence learning algorithm. See Sutskever et al. "Sequence to sequence learning with neural networks", in Advances in Neural Information Processing Systems, pages 3104-3112 (2014). On the context side, a long short term memory (LSTM) unit encodes a context, word by word, into a vector. Another LSTM then, on the response side, uses this vector to generate a response also word by word. More particularly, when the token "<EOC>" is reached, the model turns to the response side, which employs an LSTM. At this time step, this LSTM inherits the hidden state and the memory cell of the context side LSTM. Differing from the context side, a softmax layer is placed on the top of this LSTM to compute the probability of generating word w given the current history:

$$p_c(w \mid w_1^t, C) = \frac{e^{u(w,h_t)}}{\sum_{w' \in V} e^{u(w',h_t)}} \quad (4)$$

where $[u(v_1,h_t), \ldots, u(v_{|V_c|},h_t)]^T = Wh_t + b$. In the foregoing, C is the context, $V_c$ is the response-side vocabulary of the model, and the term $W \in \mathbb{R}^{|V_c| \times dim(h_t)}$ is a weight matrix, and the term $b \in \mathbb{R}^{|V_c|}$ is a bias vector. The process is halted when a token "<EOC>" is produced.

The model was trained by minimizing $L_2$-regularized cross-entropy with respect to the set of parameters θ according to:

$$J(\theta) = - \sum_{(C,w_1,w_2,\ldots,w_l) \in D} \sum_{t=0}^{l-1} \log p_c(w_{t+1} \mid w_1^t, C; \theta) + \frac{\lambda}{2}\|\theta\|^2 \quad (5)$$

where D is the set of all context-response pairs in the training data, and λ is the regularization parameter. To perform the optimization, the mini batch gradient descent method was employed, where the gradient $$\frac{\partial J}{\partial \theta}$$

is computed efficiently by the back-propagation algorithm. In the actually performed training, the AdaGrad method (Duchi et al., "Adaptive subgradient methods for online learning and stochastic optimization", The Journal of Machine Learning Research pages 2121-2159 (2011)) was used to automatically update the learning rate for each parameter. To speed up the training phase, the forward process used only the last 350 tokens of each context. The backward process was stopped at the $100^{th}$ time step after passing "<EOC>".

To find the most probable responses, the decoder employed the best-first-search algorithm, which is guaranteed to find optimal solutions. This decoder can also generate n-best responses and allows the user to choose one of them. If the current output is ended with a token "<newline>" or "<pause>", the decoder will continue generating another response.

The neural QA-LM model used in the actually performed tests is next described.

Figure 6:
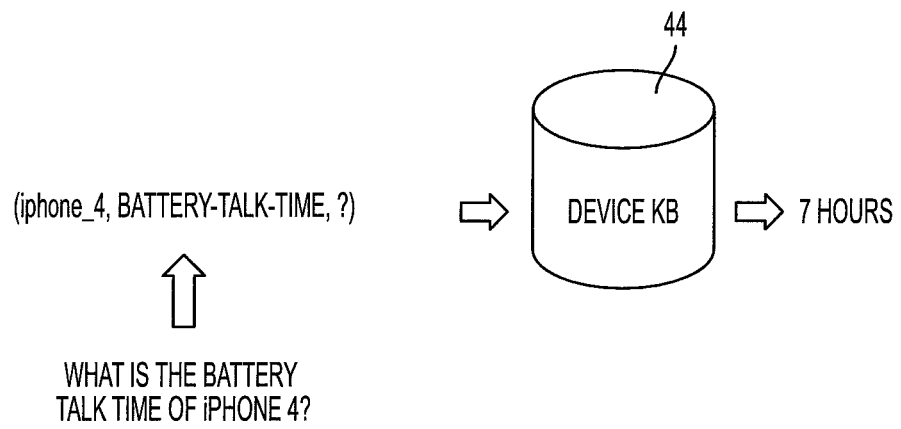
FIG. 6 diagrammatically shows an illustrative question-answer language model (QA-LM) including a neural model translating natural language questions to formal queries that are posed to the knowledge base of FIG. 1.

With reference to FIG. 6, in a standard setting, a question is posed to query a knowledge base in a formalism such as Structured Query Language (SQL). However, a human-like question answering system should take natural questions as input instead of formal expressions. Thus, as diagrammatically depicted in FIG. 6, in the illustrative QA-LM model a neural model is built to translate natural language questions to formal queries that are then posed to the knowledge base 44.

Figure 7:
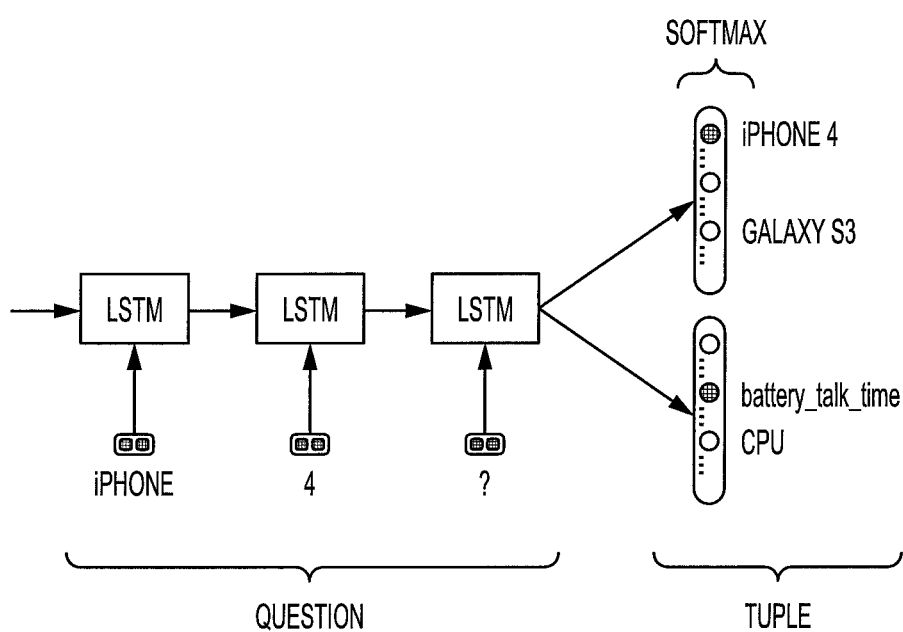
FIG. 7 diagrammatically shows an illustrative embodiment of the neural model component of the QA-LM of FIGS. 1 and 6.

With reference to FIG. 7, the illustrative QA-LM employs an LSTM to encode a natural question into a vector. Two softmax layers are then used to predict the device name and the attribute, as shown in FIG. 7. The sequence-to-tuple neural model thus translates natural questions to the formal form <device name, attribute, ?> which is suitably input to the KB 44 as shown in previous FIG. 6. Because the focus here is on a question-answer (QA) situation in which the customer or client asks about device specifications, this model is sufficient. For more complex types of domain-specific inquiries, more advanced QA models could be employed.

In an alternative embodiment, a softmax layer may be used to predict the values directly. However, this alternative approach has certain disadvantages. Such a softmax layer would comprise a large number of units, equal to the number of values that can be found in the knowledge base. This number is $O(n_d \times n_a)$ where $n_d$ and $n_a$ are respectively the number of devices and the number of attributes. By contrast, using the sequence-to-tuple model of FIG. 7, only $n_d$ $n_a$ output units are used. Additionally, it is easier to detect the device name and attribute in a question than to generate the value directly. This is because the latter requires the model to learn a mapping from <device name, attribute> to value.

With returning reference to the neural model of FIG. 7, given a question $w_1^l$ the two softmax layers output a distribution over devices $p_d(\bullet|w_1^l)$ and a distribution over attributes $p_a(\bullet|w_1^l)$ respectively. Using the knowledge base 44, a distribution over $V_{qa}$ can be computed which is the set of all values found in the knowledge base 44, according to:

$$p_{qa}(v|w_1^l) = \sum_{(d,a,v)\in T} p_d(d|w_1^l) p_a(a|w_1^l) \qquad (6)$$

where T is the set of all <device-attribute-value> triples in the KB 44.

The training of the described illustrative QA-LM is analogous to the already-described training of the neural chat model. However, in this case natural questions are not available to train the QA model. Paraphrasing methods could be used to generate natural questions, but only if suitable paraphrasing sources are available, which may not be the case for domain-specific settings. Instead, for the actually performed training a training dataset was generated by the following process. For each tuple <device name, attribute>: (1) the device name was paraphrased by randomly dropping some words (e.g., "apple iphone 4" becomes "iphone 4"); (2) the attribute name was paraphrased by similarly dropping some words and also by using the small manually generated dictionary given in Table 2; (3) l words were drawn from a vocabulary with respect to word frequency, where l~Gamma(k,n) (e.g., "I have cat"); and (4) all words generated in steps (1)-(3) were concatenated and shuffled (e.g., "cat iphone 4 have battery I"). The output of step (4) was then taken to form a training datapoint such as:

Cat iphone 4 have battery i→apple_iphone_4 battery_talk_time

To make it more realistic, complex questions were also generated by concatenating simple ones, e.g.:

galaxy s3 dog mouse cpu buy cake cat iphone 4 have battery i→apple_iphone_4 battery_talk_time These kinds of questions are sufficient to cover the dialogue scenario when the client continues asking about another device and attribute. In this case, the system suitably focuses on the latest device and attribute.

TABLE 2

Paraphrasing Attributes

| Attribute | Alternatives |
| --- | --- |
| battery capacity | battery size |
| battery standby time | battery life |
| battery talk time | battery life |
| camera megapixels | megapixel, mega pixel, mp, mega pixels |
| cpu maximum frequency | cpu, processor, power |
| internal ram | ram |
| internal storage | memory |
| primary screen physical height | screen height |
| primary screen physical width | screen width |
| Removable memory maximum size | external memory, external storage, memory card, sd card |
| secondary camera maximum resolution | front camera resolution |
| secondary camera megapixels | front megapixel, front mega pixel, front mp, front mega pixels |

Using this method, a training set for training the QA-LM was generated of 7,682,365 datapoints and a development set of 10,000.

Figure 8:
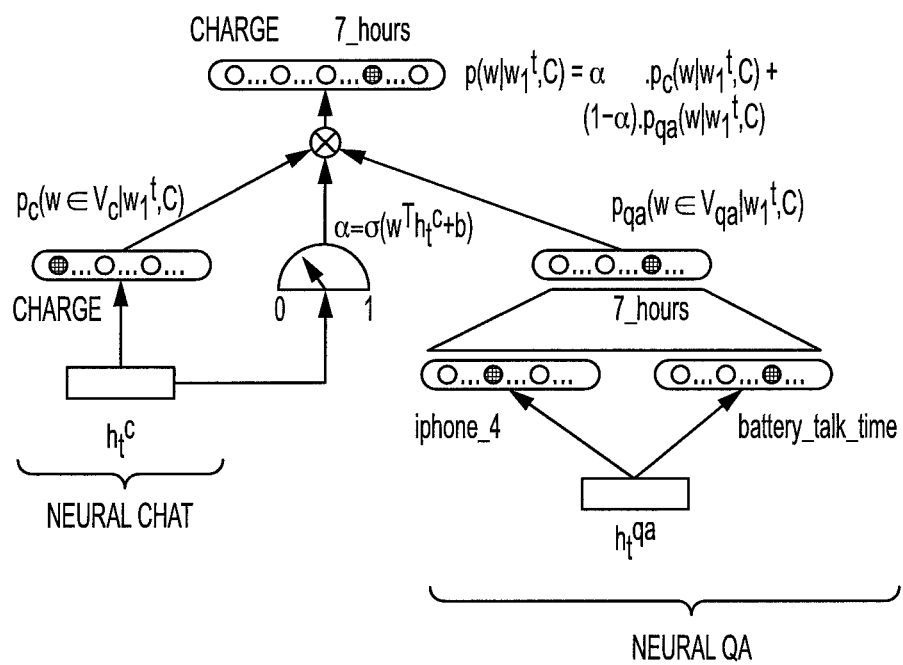
FIG. 8 diagrammatically shows another embodiment of the mixture model implemented by the dialog support module of the dialog device of FIG. 1, which integrates the neural chat LM of FIG. 5 and the QA-LM of FIGS. 6 and 7.

With reference to FIG. 8, the neural chat model (described with reference to FIG. 5) and the neural QA model (described with reference to FIGS. 6 and 7) were integrates using the LSTM-based mixture-of-LM's model (described with reference to FIGS. 2 and 3). Because the neural chat model also employs LSTMs to encode histories into vectors, the integration makes use of the hidden state of the neural chat model LSTM to compute normalized weights, as shown in FIG. 8. The rationale behind this approach is as follows. The neural chat model is expected to generate smooth responses into which the neural QA model effectively "inserts" values retrieved from the knowledge base 44. Because the hidden state of the neural chat model captures the uncertainty of generating the next word, it is also able to detect whether the next word should be generated by the neural chat model.

Let C and $w_1^t$ be a context and words generated before. Then the distributions $p_c(\bullet|w_1^t,C)$ and $p_{qa}(\bullet|w_1^t,C)$ are computed using Equation (4) and Equation (6), respectively. Then, the distribution $p(\bullet|w_1^t,C)$ over the union of the respective vocabularies $V_c \cup V_{qa}$ is computed as a mixture of $p_c$ and $p_{qa}$ according to:

$$\alpha = \sigma(w^T h_t^c + b)$$

$$p(w|w_1^t,C) = \alpha \cdot p_c(w|w_1^t,C) + (1-\alpha) \cdot p_{qa}(w|w_1^t,C)$$

where $h_t^c$ is the hidden state of the neural chat model, $\sigma$ is the sigmoid function, $w \in \mathbb{R}^{dim(h_t^c)}$ and $b \in \mathbb{R}$. Note that the sigmoid function is equivalent to the softmax function for two output units—hence the sigmoid function can be used in place of the softmax function for the normalization where the input includes only two distributions.

To train the integration model of FIG. 8, in the actually performed tests the neural chat model and the neural QA model were kept frozen and the training minimized the following object function with respect to $\theta = (w,b)$:

$$J(\theta) = -\sum_{(C,w_1,w_2,\ldots,w_l) \in D} \sum_{t=0}^{l-1} \beta(w_{t+1}) \cdot \log p(w_{t+1}|w_1^t, C; \theta) + \frac{\lambda}{2}\|\theta\|^2$$

where:

$$\beta(w) = \begin{cases} 100 & \text{if } w \in V_{qa} \setminus V_c \\ 1 & \text{otherwise} \end{cases}$$

where $\lambda$ is the regularization parameter and D is the set of all training device-specification context-response pairs. The parameter $\beta(w \in V_{qa} \setminus V_c)$ is set to the relatively high value of 100 because it is desired for the training phase to focus on those tokens representing values in the knowledge base but not supported by the neural chat model. Another reason for choosing this high value for $\beta(w \in V_{qa} \setminus V_c)$ is that, in the set of target context-response pairs, tokens found in $V_c$ significantly outnumber tokens found in $V_{qa}$.

A decoder similar to that used in the neural chat model can be used here. To review, in the neural chat model decoder the current best open prefix (which is not ended by "<EOR>") is extended to $V_c \cup V_{qa}$ successors by attaching every word in the vocabulary to its tail. The decoder for the integrated model of FIG. 8 differs in that the decoder first attaches each w∈$V_c$ to the tail of the chosen open prefix. The decoder then, for each device name d and each attribute a, attaches to the tail of the prefix a token <d, a>. This generation approach makes it more realistic to generate a value of one single best <d,a>, rather than a value of many low probability <d', a'>. In the tested implementation, it a constraint was stipulated that does not allow a response to contain more than one token from the neural QA model. In other words, a response is to answer not more than one question.

In the following, test results for the actually constructed implementation of the integrated model of FIG. 8 are described. In presenting the results, perplexity per word is used as a performance metric, and some chat examples are shown for further illustration.

The neural chat model was tested in isolation using the already described dialog training data. The output $h_t$ and memory $c_t$ of each LSTM are 1024-d vectors. The vocabulary of each side has 19,300 words (i.e., all words appearing more than once in the training data). Each word was assigned to a 512-d vector, which is initialized randomly and learnt later. The model was trained with the learning rate 0.01, until its perplexity per word on the development set converged. The neural chat model was compared against a standard KN-smoothing 5-gram model trained on all responses found in the training dataset. The 5-gram model was tested to have a perplexity per word of 7.7 whereas the neural chat model disclosed herein gained a significantly lower perplexity, 5.6. To determine whether this reduction came from the LSTMs only or also from conditioning on contexts, the neural chat model was trained a second time, but without giving contexts. The new perplexity per word was 6.8. This indicates that both the LSTMs and contexts contribute to the significant reduction in perplexity.

The following are two examples of the output of the neural chat model, indicating that it provides reasonably acceptable natural language dialog. In these examples the "AGENT" outputs were produced by the neural chat model.

Example 1

| | |
|---|---|
| CLIENT: | hello, i want to register a customer |
| AGENT: | thanks for chatting with X. i'm happy to support you and ensure that our customer is registered. |
| CLIENT: | what should i do? |
| AGENT: | name, number, carrier, device. |
| CLIENT: | Y, 123, att, iphone 5 |
| AGENT: | was there anything else i could help you out with today? |
| CLIENT: | that's all what i need. thanks |
| AGENT: | great, thanks for chatting with X. let us know if you need anything else. |

Example 2

| | |
|---|---|
| CLIENT: | hello |
| AGENT: | hi |
| CLIENT: | could you tell me the battery life of iphone 5? |
| AGENT: | that's an excellent question, i can definitely help you with that! would you mind if i took two or three minutes to do some research on that? |
| CLIENT: | no problem |
| AGENT: | thanks for you patience! battery talk time: 14.00 hours the average is 8 h (509 min) stand-by time: 8.3 days (200 hours) the average is 20 days (481 hours) capacity: 1420 mah |
| CLIENT: | thanks |
| AGENT: | no problem was there anything else i could help you with today? |
| CLIENT: | no thanks |
| AGENT: | thank you for contacting X. have a great rest of your day! |

The responses in Examples 1 and 2 look smooth. However, some given values are not correct; for instance, the standby time should be 225 hours. If being asked difficult questions, such as comparing two devices, the model also does not provide satisfactory results, as shown in Example 3.

Example 3

| | |
|---|---|
| CLIENT: | hi, which phone is better, iphone 5 or galaxy s iii? |
| AGENT: | that's an excellent question, i can definitely help you with that! would you mind if i took two or three minutes to do some research on that? |
| CLIENT: | go ahead |
| AGENT: | thanks for you patience! #UNKNOWN# was there anything else i could help you out with today? |

Tests on device-specification chats are considered next. To this end, training of the neural chat model was continued on the device-specification training data (target context-response pairs selected from the dialogs using the heuristic as described previously) with a smaller learning rate, 0.001. Using this smaller learning rate it may be expected that the model will not forget what it has learnt on the chat corpus. The neural QA model was then trained on the data generated as described previously (e.g., by processing <device name, attribute tuples including randomly dropping words). The output $h_t$ and memory $c_t$ of the LSTM used in the model are 1024-d vectors. Its vocabulary has 12,700 words. The model was trained until its likelihood on the development set converged. Finally, the integration model was trained on the device-specification training data.

Table 3 presents perplexities computed on all tokens and on only value tokens that are found in the knowledge base. It is evident that the integration does not help to decrease the perplexity on all tokens, though the increase (0.7) is small. However, it does help to decrease perplexity 38.3% on value tokens.

TABLE 3

Perplexities of the neural chat model and the integration model

| | Neural chat | Integration |
|---|---|---|
| All tokens | 14.7 | 15.4 |
| Only value tokens | 75.8 | 46.8 |

The increase of perplexity on all tokens is believed to be due to the fact that the average value of when the next token should be generated by the neural chat model alone is 0:954<1. That is, the integrated model wrongly puts weight 4.6% of the time on words in $V_{qa}$, when it should select a word in $V_c$, which increases its perplexity on such cases. The gain over value tokens does not help because value tokens are very rare, only about 6.7% of the data. The significant decrease of perplexity on value tokens shows that using the neural QA model is helpful, especially for predicting the right values, which are usually more important to the user than general words in the domain of mobile telephony support.

Some dialog examples follow. In Example 4, the client asks about an attribute of two devices.

Example 4

| CLIENT: | hello, what is the battery talk time of lumia 900 |
| --- | --- |
| AGENT: | nokia\_lumia\_900\|\|\|battery\_talk\_time hours |
| CLIENT: | and how about zte blade |
| AGENT: | zte\_blade\|\|\|battery\_talk\_time hours |
| CLIENT: | thanks |
| AGENT: | was there anything else i could help you out with today? |
| CLIENT: | that is all. thanks |
| AGENT: | thank you for contacting X. have a great rest of your day! |

Example 5 presents a scenario which again is about one device, but here with two attributes.

Example 5

| CLIENT: | i want to know about how fast is the processor of apple ipad 2 |
| --- | --- |
| AGENT: | that's an excellent question, i can definitely help you with that! apple\_ipad\_2\|\|\|cpu\_maximum\_frequency ghz was there anything else i could help you out with today? |
| CLIENT: | and its ram? |
| AGENT: | apple\_ipad\_2\|\|\|internal\_ram gigabytes |
| CLIENT: | thanks |
| AGENT: | was there anything else i could help you out with today? |

Figure 9:
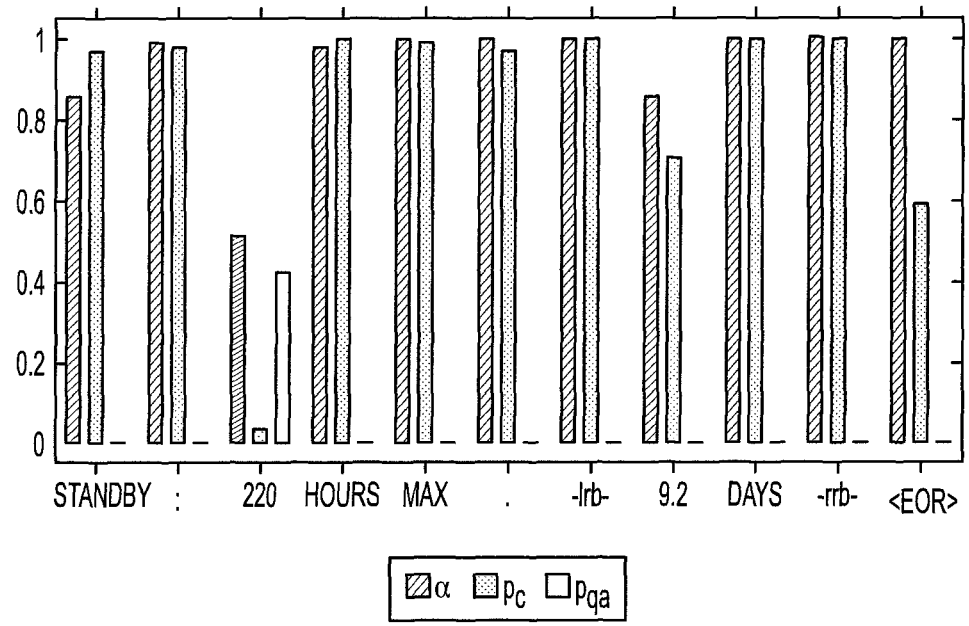
FIGS. 9 and 10 present experimental results as described herein.
Figure 10:
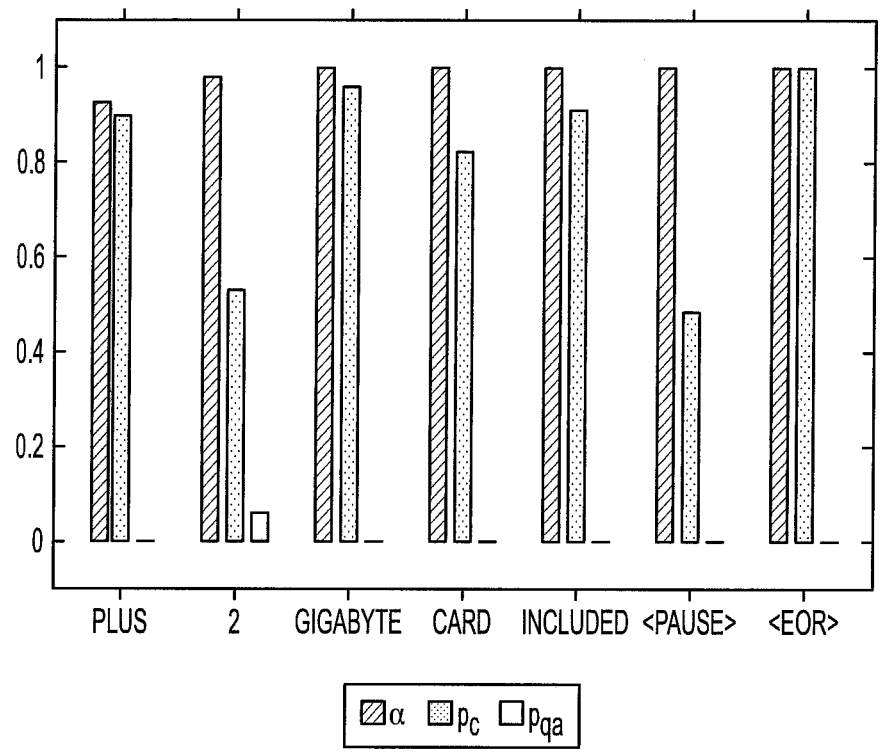

With reference to FIGS. 9 and 10, two context-response pairs in the development set are chosen, and the parameters $\alpha$, $p_c$, and $p_{qa}$ are visualized. FIG. 9 presents $\alpha$, $p_c$, and $p_{qa}$ for the context-response pair: {<CLIENT> what is the batt life on the new photon q<AGENT> that's an excellent question, i can definitely help you with that !<pause><AGENT> talk: 7.5 hours max. -lrb- 450 minutes -rrb- <newline><EOC>}—{standby: 220 hours max. -lrb- 9.2 days -rrb- <EOR>}. In FIG. 9, it is seen that $\alpha$ tends to have high values (>0:9) for tokens (e.g., "hours, days") that should be generated by the neural chat model. On the other hand, a has lower values for tokens (e.g., "220") that should be generated by the QA model. Note that because the value "9.2" is not in the knowledge base, its $p_{qa}$ is zero.

FIG. 10 presents $\alpha$, $p_c$, and $p_{qa}$ for the context-response pair: {<CLIENT> hello brandon i was wondering how many gb s of internal memory does the boost mobile galaxy prevail have <AGENT> sorry to hear that this is giving you trouble, but i will be happy to assist you. <CLIENT> ok <AGENT>117 mb internal storage, available to user <newline><EOC>}—{plus 2 gigabyte card included <pause><EOR>}. FIG. 10 shows that neural QA model is not always helpful. In this example, the token "2" receives very high values of $\alpha$ and $p_c$. This is because the constituent "plus 2" appears many times in the training data. The neural chat model thus is able to remember this fact. Therefore, the integration model chooses the neural chat model instead of the neural QA model to generate this token.

In embodiments disclosed herein, an LSTM-based (or more generally, RNN-based) mixture-of-experts is employed for language modelling. At each time step (i.e. each next word in the utterance under construction), the LSTM is used to encode the whole dialog history to compute a set of normalized weights. The final output of the LSTM at each time step is a sum of weighted outputs from given independent component language models. This mixture distribution is used to choose a next word of an utterance, and this process is repeated for each word until a suitable terminator is selected, such as <EOR> or <EOC> in the illustrative examples. The approach can be used to integrate a neural chat model with a neural QA model, so as to combine the linguistic capability of the neural chat and the domain-specific technical expertise of the QA model. Experimental results presented herein demonstrate that the integration model is capable of performing chats in which the user asks about device-specification questions.

In another disclosed aspect, artificial question-answer data are generated, e.g. by randomly dropping words, that cover more chat scenarios, which enables effective training without reduced need to acquire domain-specific training data.

The disclosed approaches are expected to find use in a wide range of dialog applications. The illustrative tests were performed in the domain of mobile telephony support, with questions being posed about device specifications. In the same domain of mobile telephony support, in another contemplated application questions may be posed regarding how to solve a technical problem, in which the knowledge base stores answers comprising word strings. As another example, in the domain of electronic learning (e-learning), an automatic math instructor could be developed by integrating a language model with a language model that can output mathematical content. These are merely illustrative examples.

With reference back to FIG. 1, it will be appreciated that the disclosed functionality of the dialog device and its constituent components implemented by the computer 12 may additionally or alternatively be embodied as a non-transitory storage medium storing instructions readable and executable by the computer 12 (or another electronic processor or electronic data processing device) to perform the disclosed operations. The non-transitory storage medium may, for example, include one or more of: an internal hard disk drive of the computer 12, external hard drive, a network-accessible hard drive or other magnetic storage medium; a solid state drive (SSD) of the computer 12 or other electronic storage medium; an optical disk or other optical storage medium; various combinations thereof; or so forth.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A dialog device comprising:
   a natural language interfacing device comprising a chat interface or a telephonic device;
   a natural language output device comprising a display device; and
   a computer programmed to store natural language dialog conducted via the natural language interfacing device and to construct a current natural language utterance word-by-word with each word of the current natural language utterance being chosen by operations including:

applying K independent language models $F_1, \ldots, F_k$ to a context x comprising a concatenation of the stored natural language dialog and the current natural language utterance up to but not including the word being chosen where K is a positive integer having a value of at least two, normalizing each word distribution output by each of the applied K independent language models to generate corresponding normalized word distributions and applying a recurrent neural network (RNN) to the normalized word distributions output by the K applied independent language models to generate a mixture distribution y comprising a weighted sum of the normalized word distributions output by the applied K independent language models according to:

$$y = \sum_{k=1}^{K} p(k|x) F_k(x)$$

where the p(k|x) terms are computed by a gating network which is a neural network whose output is a normalized vector; and choosing the next word by sampling the mixture distribution;

wherein the computer is further programmed to repeat construction of a current natural language utterance a plurality of times to construct a plurality of current utterance candidates, and the display device is configured to output a list of the current utterance candidates on the display device; and wherein the K independent language models include: (i) a neural chat model for capturing natural language content, and (ii) at least one question-answer (QA) language model for capturing domain-specific content.

2. The dialog device of claim 1 wherein:
the natural language output device further comprises the speech synthesizer.

3. The dialog device of claim 1 wherein the RNN is a Long Short-Term Memory (LSTM) model or a Gated Recurrent Unit (GRU).

4. The dialog device of claim 1 wherein the normalizing comprises applying a softmax function to generate the normalized distributions.

5. The dialog device of claim 1 wherein K=2 and the normalizing comprises applying a sigmoid function to generate the normalized distributions.

6. The dialog device of claim 1 wherein the at least one QA language model is configured to provide a distribution of answers obtained from a knowledge base (KB) over questions directed to the KB.

7. The dialog device of claim 6 wherein the K independent language models further includes at least one language model that is not configured to provide answers obtained from a KB.

8. The dialog device of claim 6 wherein the computer is programmed to apply the at least one QA language model to the context by operations including:

computing a first probability distribution over a set of first KB question parameters for the context;

computing a second probability distribution over a set of second KB question parameters for the context;

computing a question probability distribution as a product of the first probability distribution and the second probability distribution;

identifying a question posed by the context using the question probability distribution; and outputting, for the at least one QA language model, a distribution of answers obtained from the KB over the question probability distribution.

9. The dialog device of claim 1, wherein each independent language model computes the respective word distribution over an associated vocabulary.

10. A dialog method comprising:
conducting a natural language dialog using a chat interface or a telephonic device;

while conducting the natural language dialog, constructing a current natural language utterance word-by-word using a computer programmed to choose each word of the current natural language utterance by operations including:

applying K language models $F_1, \ldots, F_K$ to a context x comprising a concatenation of the natural language dialog and the current natural language utterance up to but not including the word being chosen where K is a positive integer having a value of at least two, applying a recurrent neural network (RNN) to word distributions output by the K applied language models to generate a mixture distribution y comprising a weighted sum of the word distributions output by the K applied language models wherein the RNN is applied according to:

$$y = \sum_{k=1}^{K} p(k|x) F_k(x)$$

where the p(k|x) terms are computed by a gating network which is a neural network whose output is a normalized vector, and choosing the next word using the mixture distribution y; and outputting the constructed current natural language utterance via one of the chat interface, a display device, and a speech synthesizer outputting speech to the telephonic device;

wherein the K applied language models include: (i) a neural chat model for capturing natural language content, and (ii) at least one question-answer (QA) language model for capturing domain-specific content.

11. The dialog method of claim 10 wherein:
the choosing of the next word is by sampling the mixture distribution y, the constructing is repeated a plurality of times to construct a plurality of current natural language utterance candidates, and the outputting comprises outputting a list of the current natural language utterance candidates via a display device.

12. The dialog method of claim 10 wherein the RNN is a Long Short-Term Memory (LSTM) model.

13. The dialog method of claim 10 wherein the computer is programmed to choose each word of the current natural language utterance by operations further including:

normalizing the word distributions output by the K applied language models using a softmax or sigmoid function.

14. The dialog method of claim 10 wherein the at least one QA language model is configured to provide a distribution of answers obtained from a knowledge base (KB) over questions directed to the KB.

15. The dialog method of claim 14 wherein the K applied language models further includes at least one language model not configured to provide answers obtained from a KB.

16. The dialog method of claim 14 wherein the applying of the at least one QA language model to the context includes:
  computing a first probability distribution over a set of first KB question parameters for the context;
  computing a second probability distribution over a set of second KB question parameters for the context;
  computing a question probability distribution as a product of the first probability distribution and the second probability distribution;
  identifying a question posed by the context using the question probability distribution; and
  outputting, for the at least one QA language model, a distribution of answers obtained from the KB over the question probability distribution.

17. A non-transitory storage medium storing instructions readable and executable by a computer to construct a current natural language utterance for continuing a natural language dialog by a method in which each word of the current natural language utterance is chosen by operations including:
  applying K language models $F_1, \ldots, F_K$ to a context comprising a concatenation of the natural language dialog and the current natural language utterance up to but not including the word being chosen where K is a positive integer having a value of at least two, wherein the K language models include a neural chat model for capturing natural language content, and at least one question-answer (QA) language model for capturing domain-specific content;
  normalizing word distributions output by the K language models to generate corresponding normalized word distributions;
  applying a recurrent neural network (RNN) to the normalized distributions to generate a mixture distribution comprising a weighted sum of the normalized word distributions output by the K language models according to:

$$y = \sum_{k=1}^{K} p(k \mid x) F_k(x)$$

where the p(k|x) terms are computed by a gating network which is a neural network whose output is a normalized vector; and
  choosing the next word using the mixture distribution;
  wherein the RNN is a Gated Recurrent Unit (GRU).

18. The non-transitory storage medium of claim 17 wherein: the at least one QA language model is configured to provide a distribution of answers contained in a knowledge base (KB).

* * * * *